Nov. 10, 1953  H. H. HOBBS  2,658,475
LAYING NEST
Filed Dec. 23, 1949
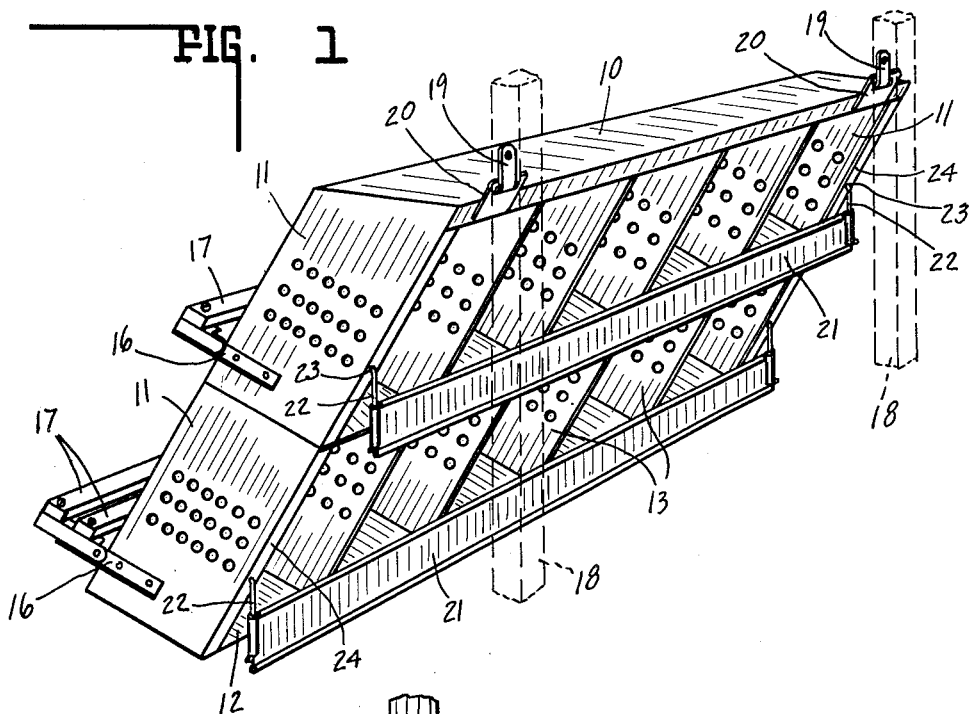
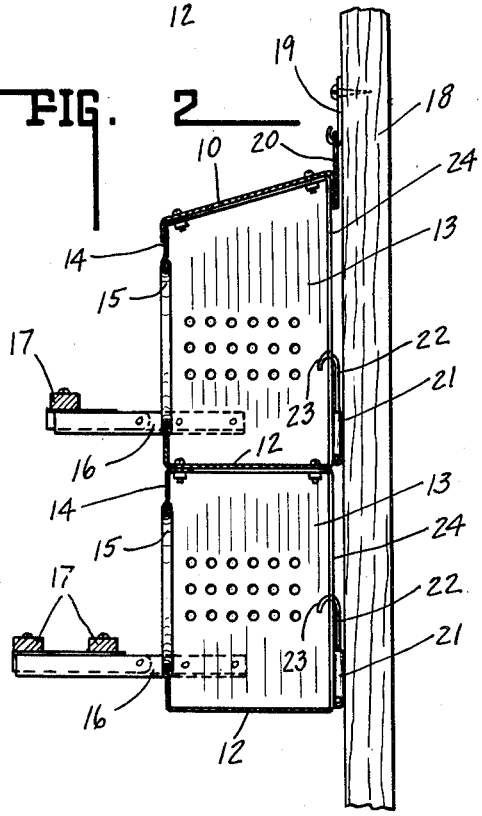
INVENTOR.
HOWARD H. HOBBS.
BY
Lockwood, Goldsmith & Galt
ATTORNEYS.

Patented Nov. 10, 1953

2,658,475

UNITED STATES PATENT OFFICE 2,658,475

LAYING NEST

Howard H. Hobbs, Tipton, Ind., assignor to The Oakes Manufacturing Company, Tipton, Ind., a corporation Application December 23, 1949, Serial No. 134,735

3 Claims. (Cl. 119—45)

This invention relates to metal laying nests for poultry houses of the unit type having a plurality of individual nests in one or more tiers adapted to be suspended from the wall or studding of the poultry house.

The object of the invention is to provide such unit nests with open backs, but provided with a hingedly mounted retaining strip for keeping the litter in the nest while in use and prevent eggs from dropping therefrom, while automatically swinging to open position to facilitate cleaning upon the unit being swung from the studding of the wall.

Thus, while the nest hangs against the studding, the retaining strips will be clamped and held in their retaining position, but upon the unit of nests being swung about their pivotal mounting outwardly from the studding, the retaining strips will automatically swing away from the nests to free the litter and permit it to slide and be freely swept from the floor of the nest.

The full nature of the invention will be understood from the accompanying drawings and the following description and claims:

Fig. 1 is a perspective view of a unit of nests shown swung outwardly from the supporting studding with the retaining strips hanging in a vertical open position.

Fig. 2 is a central vertical section through the unit of nests suspended from the studding with the retaining strips clamped thereby in closed position.

In the drawings there is shown a unit of laying nests comprising two tiers with five nests to a tier. The unit is formed of sheet metal having a sloping top 10, end walls 11 and floors 12. The nests are separated by the intervening partitions 13. Each nest is formed with a front wall 14 having an opening 15 therein for entry of the poultry. Secured to the end walls there are supporting brackets 16 mounting the transverse roosting strips 17.

The unit of nests is adapted to be hingedly supported from any suitable support, usually the studding 18 of the interior wall of a poultry house so as to lie against the several faces thereof. For this purpose a suitable hook 19 is secured to the studding over which an eyelet 20 is engaged so that the back of the nest bears against the studding when in use, as shown in Fig. 2, but may be swung outwardly and upwardly therefrom to the position shown in Fig. 1.

It is desirable that the back of the nests in the unit be open, but protection provided against litter or eggs dropping therefrom. Thus, each tier of nests is provided with a retaining strip 21 extending transversely of the lower portion of each tier of nests along the floors thereof. Said retaining strips are preferably of sheet metal beaded along their upper and lower edges for reinforcement. Secured to the opposite ends of each strip there is a hanger rod 22, which rod extends upwardly therefrom and is provided with a hook 23 at its upper end adapted to be inserted and hooked through an aperture provided in a reinforcing flange 24 at the rear of each end wall 11. The hook 23 is so formed with respect to the aperture of the flange that it will freely pivot therein for permitting the retaining strips to swing to retaining position when clamped between the studding and the unit, and swing to open position when the nesting unit is tilted, as shown in Fig. 1, for cleaning purposes.

Thus, after the nests have been used, it is only necessary for the attendant to grasp the roosting strips 17 and swing the nesting unit forwardly and upwardly about the suspending hooks 19 to the position shown in Fig. 1. The retaining strips will then swing to open position to permit ready removal of the litter from the backs of the nests.

The invention claimed is:

1. In a laying unit for poultry having an open back, a fixed floor, end walls and a series of spaced partitions to provide laying nests therein, the combination therewith of a retaining back strip mounted to normally lie adjacent said floor, end walls and partitions across the back of the unit for retaining litter in the nests, a hanger rod secured to opposite ends of said strip to extend upwardly therefrom, and means for hingedly connecting said hanger rod adjacent the back edges of said end walls a substantial distance above the top edge of said strip for permitting said strip to swing free therefrom and in spaced relation thereto for convenient removal of litter when said unit is tilted.

2. In a laying unit for poultry having an open back, a fixed floor, end walls, a series of spaced partitions to provide laying nests therein, and a rigid support therefor, the combination therewith of a hinged connection between the top of the unit and said support to permit said unit to freely swing upwardly therefrom, a litter retaining back strip extending transversely across the open back of said unit to normally lie thereagainst and freely movable with said unit away from said support and clamped thereagainst by said unit when hanging in its normal position, the top edge of said strip being substantially spaced from the top of said open back, and a hinge member hingedly connecting the upper edge of said litter retaining back strip with said end walls to permit said strip to swing outward from said end walls and bottom and free of said support upon said unit being swung therefrom.

3. In a laying nest for poultry having an open back, a fixed floor, top and end walls, the combination therewith of a relatively narrow rigid retaining back strip adapted to normally extend across the back of the nest adjacent the floor thereof with the top edge spaced substantially below the top of the nest, and hanger straps secured at their lower ends to said strip to extend upwardly therefrom and having their upper ends pivotally connected with the rear portion of said nest for suspending said strip from the nest to permit it to swing outwardly therefrom.

HOWARD H. HOBBS.

References Cited in the file of this patent
UNITED STATES PATENTS

| Number | Name | Date |
|---|---|---|
| 417,140 | Boyer et al. | Dec. 10, 1889 |
| 609,823 | Love | Aug. 30, 1898 |
| 652,101 | Goldberg | June 19, 1900 |
| 769,797 | Glandt | Sept. 13, 1904 |
| 1,130,095 | McIntyre | Mar. 2, 1915 |
| 1,319,460 | Brown | Oct. 21, 1919 |
| 1,810,782 | Morris | June 16, 1931 |
| 1,923,980 | Hultine | Aug. 22, 1933 |
| 2,494,709 | Keagle | Jan. 17, 1950 |